Dec. 12, 1967    J. A. BADINI ETAL    3,357,621
SOLDERING APPARATUS
Filed Aug. 19, 1965    2 Sheets-Sheet 1
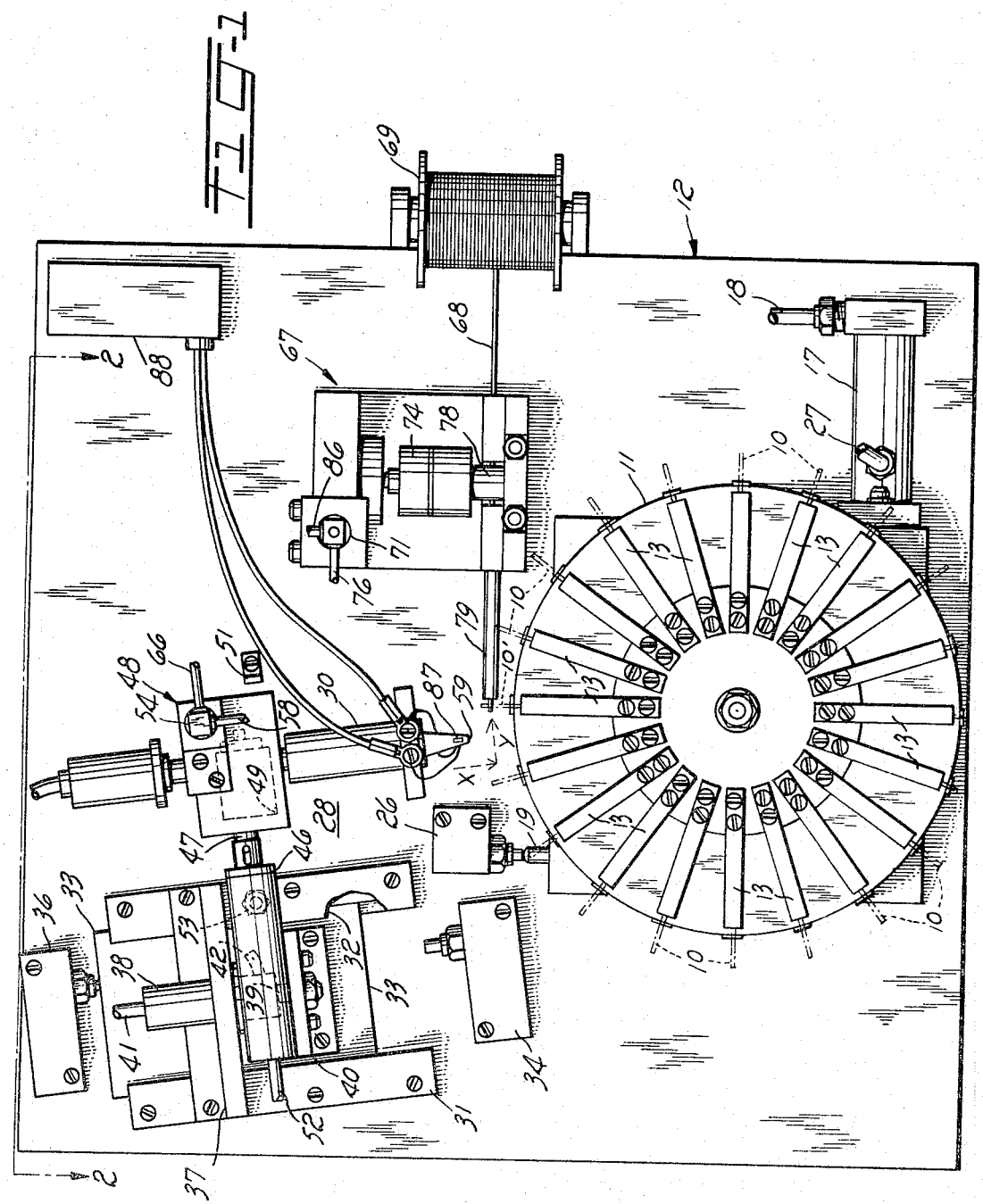
INVENTORS
J. A. BADINI
E. F. YERY
BY N. A. Addams
ATTORNEY Dec. 12, 1967   J. A. BADINI ETAL   3,357,621
SOLDERING APPARATUS
Filed Aug. 19, 1965   2 Sheets-Sheet 2
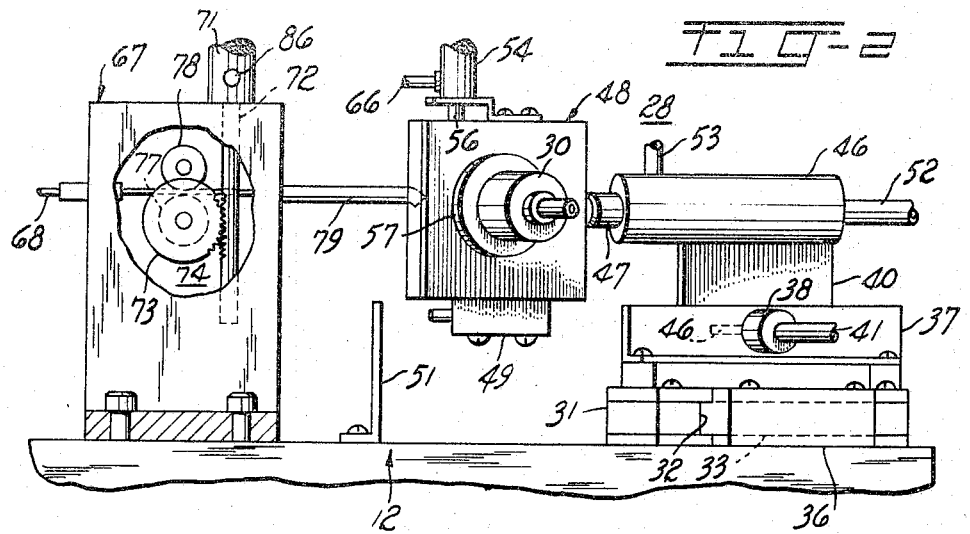
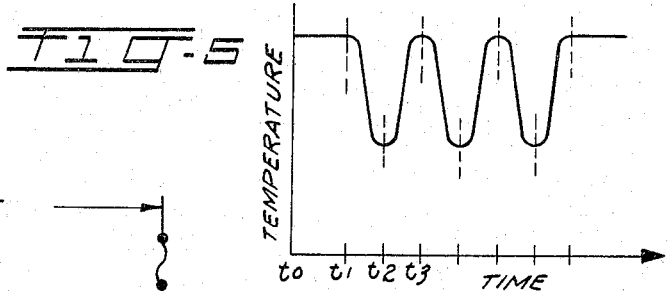
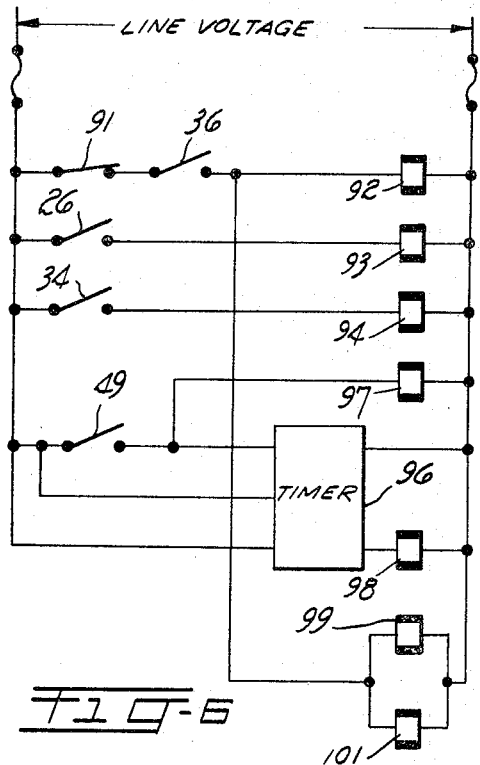
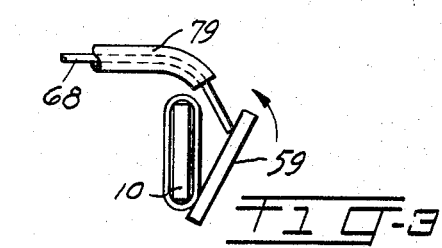
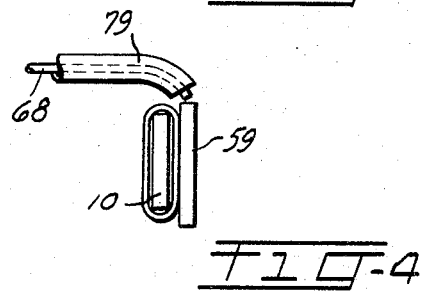

United States Patent Office 3,357,621
Patented Dec. 12, 1967

3,357,621
SOLDERING APPARATUS
John A. Badini, Bronx, N.Y., and Edmund F. Yery, Old Bridge, N.J., assignors to Western Electric Company, Incorporated, New York, N.Y., a corporation of New York
Filed Aug. 19, 1965, Ser. No. 480,895
21 Claims. (Cl. 228—47)

This invention relates to a soldering apparatus, and more particularly, to a soldering apparatus wherein the movements used by an operator in manual soldering are accurately and repetitively simulated.

In the manual soldering of articles, such as electrical terminals, many parameters interact to produce a satisfactory soldered joint. One parameter is the heat provided by the soldering iron during a soldering cycle. When the tip of the soldering iron is brought into contact with a cold terminal and cold solder is fed to the terminal and the tip, the heat provided by the soldering iron must not fall below the prescribed temperature required to efficiently melt the solder.

Another parameter is the soldering iron tip. It must be composed of a material which will efficiently transmit the heat produced by the soldering iron. Other parameters are the composition of solder alloys and solder fluxes, and the dwell time that an operator holds the soldering iron tip on the terminal.

Accordingly, an object of the invention is to provide a new and improved soldering apparatus.

Another object is to provide a new and improved soldering apparatus wherein the movements used by an operator in manual soldering are accurately and repetitively simulated.

Another object is to provide a new and improved soldering apparatus, wherein mechanisms are provided for automatically soldering electrical terminals for the purpose of gathering data with which to analyze the parameters which interact in a soldering operation, for example, the quality of soldering irons, soldering iron tips, solder alloys and fluxes, bonding characteristics of soldered joints, and the like.

With these and other objects in mind, a soldering apparatus, illustrating certain features of the invention, includes a mechanism which advances the tip of a soldering iron into contact with an article to be soldered. A device feeds solder to the article and the tip, while another device manipulates the tip of the soldering iron to spread the solder about the article in a manner duplicative of manually soldering the article.

With the soldering apparatus of this invention, detailed investigations can be made of the parameters associated with a soldering operation. As an example of the use of the apparatus, a soldering iron is mounted in the apparatus, which repetitively and cyclically simulates the movements used in manually soldering electrical terminals. A thermocouple is mounted in the iron tip to measure the changes in temperature of the soldering iron during the soldering cycles. This data is recorded and correlated in time sequence with the manual movements of soldering simulated by the soldering apparatus during the soldering cycle. By an analysis of this data and an inspection of the soldered terminals, the effectiveness of the particular alloy and flux used, and the quality of the resultant bond can be ascertained.

As another example of the use of the apparatus of the invention, data can be gathered with which to analyze the heat recovery characteristic of a soldering iron. An efficient iron tip is connected to the soldering iron, and a high quality solder alloy and a supply of uniform terminals are employed. The data recorded over a plurality of soldering cycles correlates the changes in temperature of the soldering iron with the simulated manual movements used during the soldering cycles.

The accurate correlation of temperature with the manual movements of a soldering cycle was not possible prior to the apparatus of this invention. It was not physically possible for an operator in using a soldering iron to accurately duplicate each movement of a soldering cycle exactly in the same time sequence.

Other objects and advantages of the invention will become apparent by reference to the following detailed specification and drawings, wherein:

FIG. 1 is a schematic plan view of a soldering apparatus illustrating certain principles of the invention;

FIG. 2 is a side view taken along line 2—2 of FIG. 1, and shows a support for a soldering iron and a device for automatically feeding solder;

FIG. 3 is a pictorial end view of an electrical terminal engaged by the tip of a soldering iron;

FIG. 4 is a pictorial end view of the terminal of FIG. 3 after the tip has been wiped about one side of the terminal;

FIG. 5 is a graph correlating temperature of a soldering iron with time over a plurality of soldering cycles; and FIG. 6 is an electrical schematic diagram of the control circuit for the apparatus.

Referring to FIG. 3, there is shown an end view of an elongated, electrical terminal 10 having turns of wire wrapped around it. Terminal 10 is representative of a general class of articles which can be soldered using the apparatus of this invention to gather data with which to analyze the parameters which interact in a soldering cycle.

With reference to FIG. 1, there is shown an indexable turntable 11 rotatably mounted on a support 12. Turntable 11 is comprised of insulating material, and has a plurality of slots formed therein about its periphery for receiving terminals 10. A plurality of spring clips 13 are mounted about the periphery of turntable 11 for holding terminals 10 in their respective slots.

Turntable 11 is intermittently indexed in a conventional manner by a double action air cylinder 17. When air is introduced through port 18 into the internal chamber of cylinder 17, its piston is moved to actuate a conventional ratchet mechanism (not shown) to advance turntable 11 one position. The ratchet mechanism also moves rod 19 to operate a limit switch 26. When air is introduced through port 27 into the internal chamber of cylinder 17, its piston is returned to its initial position.

Referring to FIGS. 1 and 2, support 12 has mounted thereon an assembly 28 for moving a soldering iron 30 in paths of travel which accurately and repetitively simulate the movements used in manually soldering terminals 10. Assembly 28 includes a base 31 secured to support 12, the base having channels 32 formed therein for guiding a slidable plate 33. Limit switches 34 and 36 are mounted on support 12, and are operated by plate 33 when it is at either extreme of its guided path of movement.

A bracket 37 is mounted on base 31, and supports a double action air cylinder 38 containing a piston having a piston rod 39 secured to a carriage 40, which is mounted on plate 33. When air is introduced through port 41 into cylinder 38, piston rod 39 moves carriage 40 and plate 33 to operate switch 34. When air is introduced through port 42 into cylinder 38, piston rod 39 moves carriage 40 and plate 33 to operate switch 36.

A double action air cylinder 46 is mounted on carriage 40 transverse to cylinder 38, and contains a piston having a piston rod 47 which supports a fixture 48 for holding soldering iron 30. A limit switch 49 is mounted on the bottom of fixture 48 and is operable by a bracket 51 mounted on support 12. When air is introduced through port 52 into air cylinder 46 piston rod 47 moves fixture 48 and soldering iron 16 to the right, as seen in FIG. 1, (to the left as seen in FIG. 2). When air is introduced through port 53, piston rod 47 returns fixture 48 to its original position.

A double action air cylinder 54 is mounted on fixture 48, and contains a piston having a piston rod 56. As best seen in FIG. 2, piston rod 56 is connected to a gear mechanism (not shown), which in turn is connected to collar 57 which holds soldering iron 30. When air is introduced through port 58 into cylinder 54, piston rod 56 drives the gear mechanism to rotate collar 57, thereby rotating soldering iron 30 and its tip 59 about one side of terminal 10 (see FIGS. 3 and 4). When air is introduced through port 66, piston rod 56 drives collar 57 to rotate soldering iron 30 to its initial position.

An automatic device 67 for feeding solder 68 from a spool 69 of solder is mounted on support 12. As best seen in FIG. 2, a double action air cylinder 71 is mounted on device 67, and contains a piston having a piston rod 72. Piston rod 72 has teeth thereon for engaging a gear 73 of a ratchet mechanism 74. When air is introduced through port 76 of cylinder 71, piston rod 72 is driven downward to rotate gear 73, thereby rotating a knurled disc 77. A pressure disc 78 is rotatably mounted opposite knurled disc 77. A predetermined amount of solder 68 is advanced between the rotating discs 77 and 78, and through a guide tube 79 to the V-shaped trough (see FIG. 3) formed when iron tip 59 first engages terminal 10. The amount of solder 68 fed to the V-shaped trough is controlled by the length of the stroke of piston rod 72. When air is introduced into port 86, piston rod 72 is returned to its original position.

A thermocouple element 87 is mounted in tip 59, and is connected by a pair of leads to a conventional temperature recorder 88.

It is understood that the air cylinders 17, 38, 46, 54, and 71, are connected to air valves, which are under the control of limit switches 36, 26, 34, and 49, to introduce air into the appropriate port of the respective cylinders. In order to simplify the description, the valves and connecting hoses have not been shown.

Operation

Referring to FIG. 1 and the electrical control circuit of FIG. 6: assume that the control circuit is connected to a source of power, that on-off switch 91 is closed, that the soldering apparatus has already run through several cycles of operation, and that the next cycle is about to begin. Under these conditions, switch 36 has just been closed due to its being operated by slidable plate 33.

The closure of switch 36 completes a circuit to energize a solenoid 92 which actuates air cylinder 17 to index turntable 11 to move terminal 10' to the work position. It will be understood that solenoid 92 controls a valve (not shown) which permits air to be introduced into port 18 of cylinder 17. In the interest of simplicity, however, solenoids will hereafter be described as actuating their corresponding air cylinders.

During the indexing of turntable 11, rod 19 is moved by air cylinder 17 to close switch 26. The closure of switch 26 completes a circuit to energize a solenoid 93 which actuates air cylinder 38 to move plate 33 and carriage 40 towards turntable 11. This movement of carriage 40 advances fixture 48 and soldering iron 30 such that tip 59 is moved in a path X which is substantially parallel to terminal 10' located at the work position. Plate 33 is moved forward until it closes switch 34, switches 26 and 36 being released.

The closure of switch 34 completes a circuit to energize a solenoid 94 which actuates air cylinder 46 to move fixture 48 and soldering iron 30 in a path Y. Path Y is substantially perpendicular to path X. Soldering iron 30 is moved in path Y until its tip 59 just engages terminal 10' to form a V-shaped trough therewith (FIG. 3).

When fixture 48 has completed its movement in path Y, switch 49 is closed by bracket 51 (FIG. 2). Upon the closure of switch 49, two operations occur substantially simultaneously: (1) a timer 96 is started which controls the amount of time that tip 59 remains engaged with terminal 10', and (2) a solenoid 97 is energized which operates air cylinders 54 and 71.

Air cylinder 71 actuates solder feeding device 67 to advance a predetermined amount of solder 68 into the V-shaped trough (FIG. 3), at substantially the same time that air cylinder 54 actuates collar 57 (FIG. 2) to rotate tip 59 about terminal 10' (FIG. 4). Tip 59 remains in the position shown in FIG. 4 for a dwell time dependent upon the setting of timer 96.

At the end of the predetermined dwell time, timer 96 completes a circuit to energize a solenoid 98. Solenoid 98 actuates air cylinder 38 to move carriage 40 and soldering iron 30 in path X away from turntable 11. This movement of carriage 40 moves plate 33 until it closes switch 36, switches 34 and 49 being released.

Upon the closure of switch 36, three circuits are completed to simultaneously energize solenoid 99, 101, and 92. The energization of solenoid 99 actuates air cylinder 46 to return fixture 48 and soldering iron 30 in path Y to their initial positions. The energization of solenoid 101 actuates cylinder 71 to move piston rod 72 upward to return solder feed device 67 to its initial position, and actuates cylinder 54 to move collar 57 which in turn rotates up 59 back to its initial position. The energization of solenoid 92 actuates air cylinder 17 to initiate a new cycle of operation as above-described.

With reference to FIG. 5, there is illustratively shown a temperature vs. time graph, in expanded form, correlating temperature and the movements of manual soldering which are repetitively simulated by the soldering apparatus of the invention. During the time interval $t_1-t_0$, tip 59 of soldering iron 30 is at its maximum temperature. At $t_1$, tip 59 is moved in path Y to initially contact terminal 10 (FIG. 3), wherein terminal 10 begins to extract heat from soldering iron 30.

During the interval, $t_2-t_1$, solder 68 is fed into the V-shaped trough (FIG. 3) causing a further extraction of heat from soldering iron 30. At $t_2$, tip 59 begins to move in path X away from terminal 10. During the interval $t_3-t_2$, soldering iron 30 recovers its temperature. At $t_3$ soldering iron 30 has substantially recovered at its maximum temperature, and tip 59 is again moved in path Y.

Although the apparatus of this invention has been described in the context of investigating the parameters associated with soldering terminals, it will be apparent to one skilled in the bonding and soldering art that the apparatus could readily be modified to automatically solder terminals or other articles on an assembly line. By way of example, a terminal block, having a longitudinal row of terminals thereon, could be longitudinally advanced to the work position to automatically solder the terminals thereon.

It is to be understood that the above-described embodiment is only illustrative of the principles of the invention, and other embodiments may be devised without departing from the scope of the invention.

What is claimed is:
1. A soldering apparatus, comprising:
   means for sequentially indexing articles to be soldered to a work position,
   means responsive to an article being indexed to the work position, for advancing the tip of a soldering iron into contact with the article in the work position, and
   means, responsive to the tip of the soldering iron being advanced into contact with the article in the work position, for simultaneously feeding solder material to the article and tip and moving the tip to spread the solder material about the article.
2. The soldering apparatus according to claim 1, further comprising means for sensing and recording the temperature variations of the tip during a soldering cycle.

3. A soldering apparatus, comprising:
means for sequentially indexing articles to be soldered to a work position,
a soldering iron,
means, responsive to an article being indexed to the work position, for advancing the soldering iron so as to move the soldering iron tip into contact with the article indexed to the work position, and
means, responsive to the tip of the soldering iron moved into contact with the article in the work position, for simultaneously feeding solder material to the article and tip and moving the tip to spread the solder material about the article.

4. A soldering apparatus, comprising:
means for indexing articles to be soldered to a work position,
a soldering iron,
means, responsive to an article being indexed to the work position, for advancing the soldering iron to move the soldering iron tip to form a V-shaped trough with the article indexed to the work position, and
means, responsive to the soldering iron tip being moved to form the V-shaped trough, for simultaneously feeding solder material to the trough and moving the tip to spread the solder material about the article.

5. A soldering apparatus, comprising:
means for sequentially indexing articles to be soldered to a work position,
means for advancing the tip of a soldering iron into contact with an article in the work position,
means for feeding solder material to the article and the tip, and
means for moving the tip to spread the solder material about the article.

6. The soldering apparatus according to claim 5, further comprising means coupled to the tip for sensing the temperature of the tip over a soldering cycle.

7. The soldering apparatus according to claim 6, further comprising means connected to the sensing means for recording the sensed temperature over a soldering cycle.

8. A soldering apparatus, comprising:
means for sequentially indexing articles to be soldered to a work position,
a soldering iron,
means for advancing the soldering iron so that its tip contacts with an article in the work position,
means for feeding solder material to the article and the tip, and
means for moving the tip to spread the solder material about the article.

9. In an apparatus for soldering articles,
means for sequentially indexing articles to be soldered to a work position,
a fixture, movably mounted on a platform of the apparatus, for supporting a soldering iron having a soldering tip,
a first means for advancing the fixture to move the tip in a first path substantially parallel to but spaced from an article in the work position,
a second means for advancing the fixture to move the tip in a second path substantially transverse to the first path such that the tip engages the article to form a trough therewith,
means for feeding solder material into the trough, and
means for rotating the tip to spread the solder material about the article.

10. The apparatus according to claim 9, further comprising means for sensing and recording the temperature variations of the tip over a soldering cycle.

11. A soldering apparatus, comprising:
means for sequentially indexing articles to a work position,
means for advancing the tip of a soldering iron into contact with an article in the work position,
means for feeding solder to the article and the tip, and
means for moving the tip to spread the solder about the article in a manner duplicative of the movements of manually soldering the article.

12. A soldering apparatus, comprising:
means for sequentially indexing articles to a work position,
a soldering iron,
means for advancing the tip of a soldering iron into contact with an article in the work position,
means for feeding solder to the article and the tip, and
means for moving the tip to spread the solder about the article in a manner duplicative of the movements of manually soldering the article.

13. An apparatus for gathering data with which to investigate the parameters associated with the soldering of articles, comprising:
means for sequentially indexing articles to a work position,
means for advancing the tip of a soldering iron into contact with an article indexed to the work position,
means for feeding solder to the article and the tip,
means for moving the tip to spread the solder about the article in a manner duplicative of the movements of manually soldering the article, and
means connected to the tip for sensing and recording the temperature variations of each soldering cycle of operation.

14. An apparatus for gathering data with which to investigate the parameters associated with the soldering of articles, comprising:
means for sequentially indexing articles to a work position,
a soldering iron,
means for advancing the tip of a soldering iron into contact with an article in the work position,
means for feeding solder to the article and the tip,
means for moving the tip to spread the solder about the article in a manner duplicative of the movements of manually soldering the article, and
means connected to the tip for sensing and recording the temperature variations of each soldering cycle of operation.

15. An apparatus for gathering data with which to investigate the parameters associated with soldering of terminals comprising:
a support,
means mounted on the support for sequentially indexing articles to be soldered to a work position,
a carriage slidably mounted on the support,
a soldering iron,
a fixture mounted on the carriage for supporting the soldering iron having a soldering tip,
a first means for advancing the carriage and the fixture to move the tip in a first path substantially parallel to an article indexed to the work position,
a second means for advancing the fixture to move the tip in a second path substantially transverse to the first path such that the tip forms a trough with the article,
means for feeding a predetermined amount of solder to the trough, and
means for moving the tip to spread the solder about the article in a cycle of movements which simulate the movements of manually soldering the article.

16. An apparatus for gathering data with which to investigate the parameters associated with soldering of terminals comprising:
a support,
means mounted on the support for sequentially indexing articles to be soldered to a work position,
a carriage slidably mounted on the support, a fixture mounted on the carriage for supporting a soldering iron having a soldering tip, a first means for advancing the carriage and the fixture to move the soldering iron and its tip in a first path substantially parallel to an article indexed to the work position, a second means for advancing the fixture to move the soldering iron and its tip in a second path substantially transverse to the first path such that the tip forms a V-shaped trough with the article, means for feeding a predetermined amount of solder to the trough, and means for moving the soldering iron and its tip to spread the solder about the article in a cycle of movements which simulate the movements of manually soldering the article.

17. The apparatus according to claim 16, further comprising means for controlling the dwell time that the tip contacts the article.

18. The apparatus according to claim 17 wherein the controlling means is an adjustable timer.

19. The apparatus according to claim 17, further comprising means connected to the tip for sensing the temperature thereof over a cycle of operation.

20. The apparatus according to claim 19 wherein the sensing means is a thermocouple element.

21. The apparatus according to claim 19, further comprising means for recording the temperature sensed by the sensing means.

References Cited

UNITED STATES PATENTS

| | | | |
|---|---|---|---|
| 852,869 | 5/1907 | Cerruti | 228—141 |
| 1,750,312 | 3/1930 | Emmert | 228—20 |
| 1,794,733 | 3/1931 | Regenstreif | 228—41 |
| 2,104,749 | 1/1938 | Jones | 219—110 |
| 2,372,211 | 3/1945 | Leathers | 219—110 |
| 3,217,958 | 11/1965 | Pechy | 228—19 |

RICHARD H. EANES, Jr., *Primary Examiner.*